(12) United States Patent
Feist et al.

(10) Patent No.: US 6,974,004 B2
(45) Date of Patent: Dec. 13, 2005

(54) SHOCK-ABSORBING PISTON FOR HYDRAULIC FIXTURES

(75) Inventors: Dirk Feist, Herne (DE); Kais Saadeddin, Bochum (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/365,001

(22) Filed: Feb. 11, 2003

(65) Prior Publication Data

US 2003/0150679 A1   Aug. 14, 2003

(30) Foreign Application Priority Data

Feb. 13, 2002   (DE) ................ 102 06 104

(51) Int. Cl.⁷ ................................ F16F 9/34
(52) U.S. Cl. ................. 188/322.15; 188/322.22
(58) Field of Search ............... 188/322.15, 322.22, 188/312, 317, 280, 282.1–282.9

(56) References Cited

U.S. PATENT DOCUMENTS

| 3,113,644 A | * | 12/1963 | Wössner ............... 188/282.5 |
| 4,723,640 A | * | 2/1988 | Beck ................... 188/282.3 |
| 4,830,152 A | * | 5/1989 | Rauert et al. .......... 188/322.15 |
| 5,219,430 A | * | 6/1993 | Antoine ............... 267/140.12 |

FOREIGN PATENT DOCUMENTS

GB   2071807 A   *   9/1981

* cited by examiner

Primary Examiner—Pam Rodriguez
(74) Attorney, Agent, or Firm—Max Fogiel

(57) ABSTRACT

A shock-absorbing piston for hydraulic fixtures, especially hydraulic dashpots for motor vehicles, and separating two hydraulics chambers. The body of the piston is breached by one or more ports. The end of each is blocked by a resilient or resiliently loaded cap. The object is to improve the flow of hydraulic fluid. The ports (13 & 14) are sickle-shaped and the cap rests eccentric against the face of the piston's body (16).

12 Claims, 3 Drawing Sheets

SHOCK-ABSORBING PISTON FOR HYDRAULIC FIXTURES

BACKGROUND OF THE INVENTION

The present invention concerns a shock-absorbing piston for hydraulic fixtures, especially hydraulic dashpots for motor vehicles.

Shock-absorbing pistons for hydraulic fixtures are employed to decelerate the flow of hydraulic fluid, especially oil, through motor-vehicle dashpots, relieving the requisite wheel-suspension resilience.

Shock-absorbing pistons of this genus are known from, for example, European Patent 0 275 368 A1. To attain the desired performance curve when decelerating the flow of hydraulic fluid through dashpots, the piston's ports must be as open as possible to prevent the shape of the curve from approaching that of a hydraulic throttle.

SUMMARY OF THE INVENTION

Although state-of-the-art performance curves are highly satisfactory, the "easy-driving" valves now employed require even better ones. There is accordingly a need to improve even further the flow of oil through the piston.

This object is attained in a shock-absorbing piston of the aforesaid genus by the characteristics recited in the body of claim 1 herein.

The shock absorption afforded by the piston in accordance with the present invention is very gentle. The component can accordingly be employed not only as the major piston in a dashpot but also within an interior or exterior bypass, or even in the base of a two cylinder dashpot.

BRIEF DESCRIPTION OF THE DRAWINGS

The present invention will now be specified with reference to the accompanying drawing, wherein.

DESCRIPTION OF THE PREFERRED EMBODIMENTS

Figure 1:
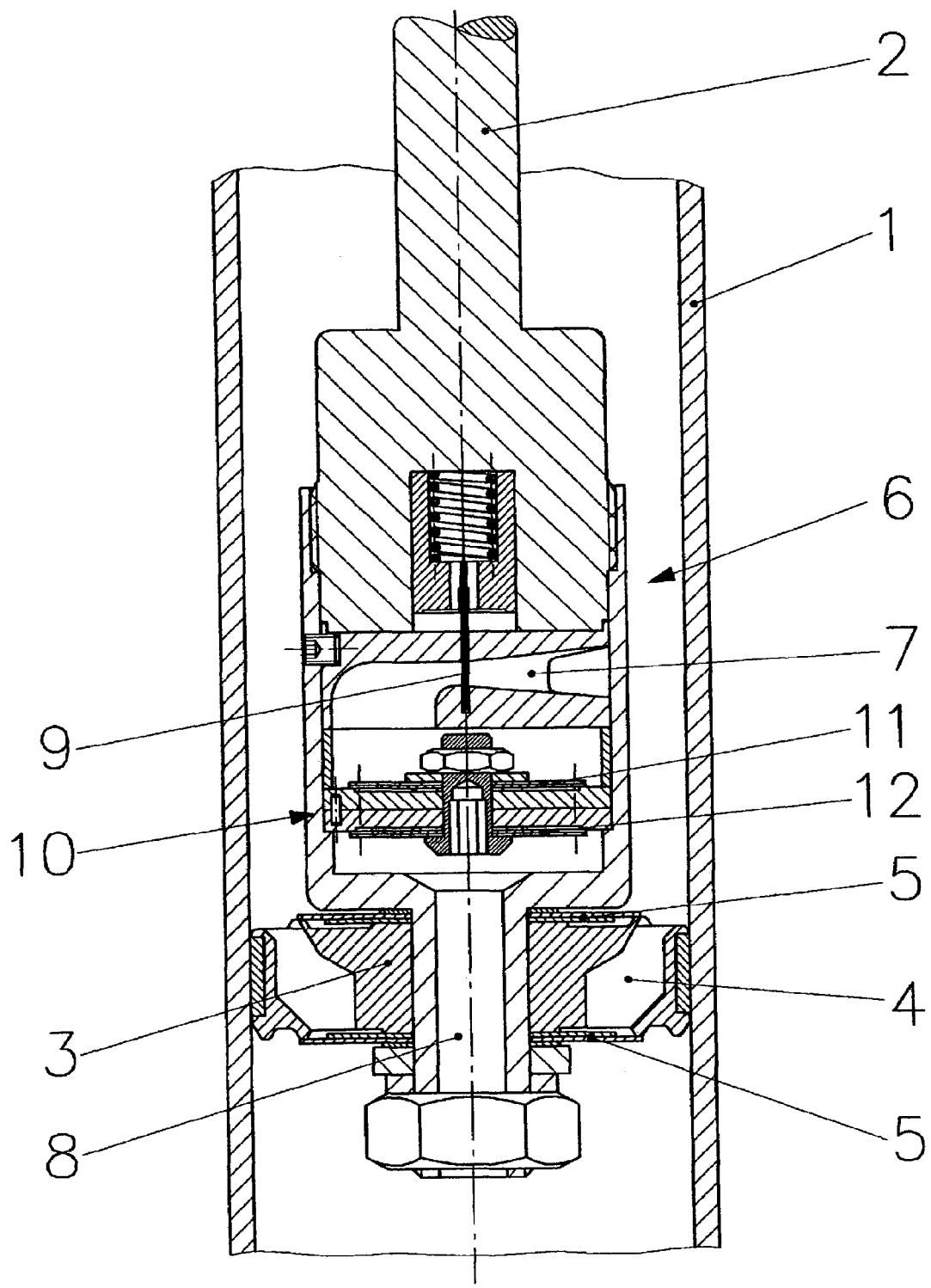
FIG. 1 is a section through part of a state-of-the-art dashpot.

Dashpots for contemporary motor vehicles are often provided with controlled or regulated bypasses, allowing the shock-absorption properties of the dashpot to be adapted to various driving demands while ensuring reliable road holding. A dashpot of this genus is illustrated in FIG. 1. The fixture in this case is a single cylinder dashpot. Its cylinder 1 is charged with hydraulic fluid. A piston rod 2 travels in and out of the cylinder. Mounted on the end of the rod is a shock-absorbing piston assembly. This assembly is provided with a traditional fluid-compressing piston 3, with ports 4 capped at each end by stacks 5 of cup springs that also operate as checkvalves.

The shock-absorbing piston assembly is also provided with a bypass 6 with two intake channels, specifically a regulated intake channel 7 and an intake channel 8 that extends along the piston's central axis. The flow is regulated on the one hand by a pin 9 and on the other by a shock-absorbing piston 10. Like fluid compressing piston 3, shock-absorbing piston 10 is capped by stacks 11 and 12 of cupsprings at each end. At the state-of-the art illustrated in FIG. 1, both pistons are breached by several narrow ports, which is the cause of the aforesaid drawbacks.

Figure 2:
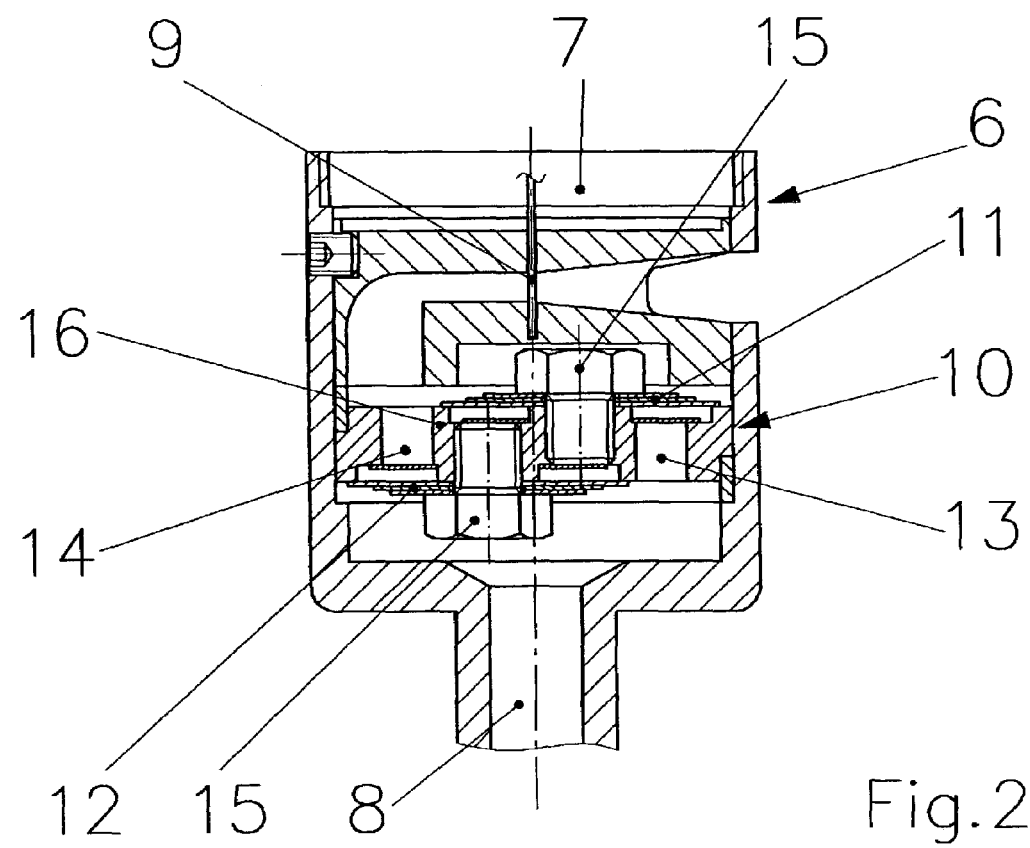
FIG. 2 is a section through a bypass-regulated piston in accordance with the present invention.
Figure 3:
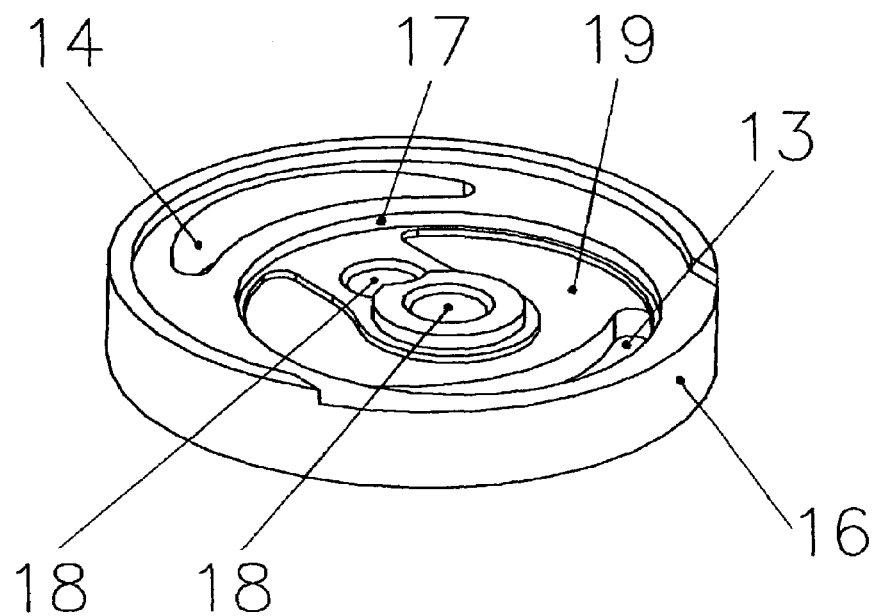
FIG. 3 is a three-dimensional view of the piston illustrated in FIG. 2.
Figure 4:
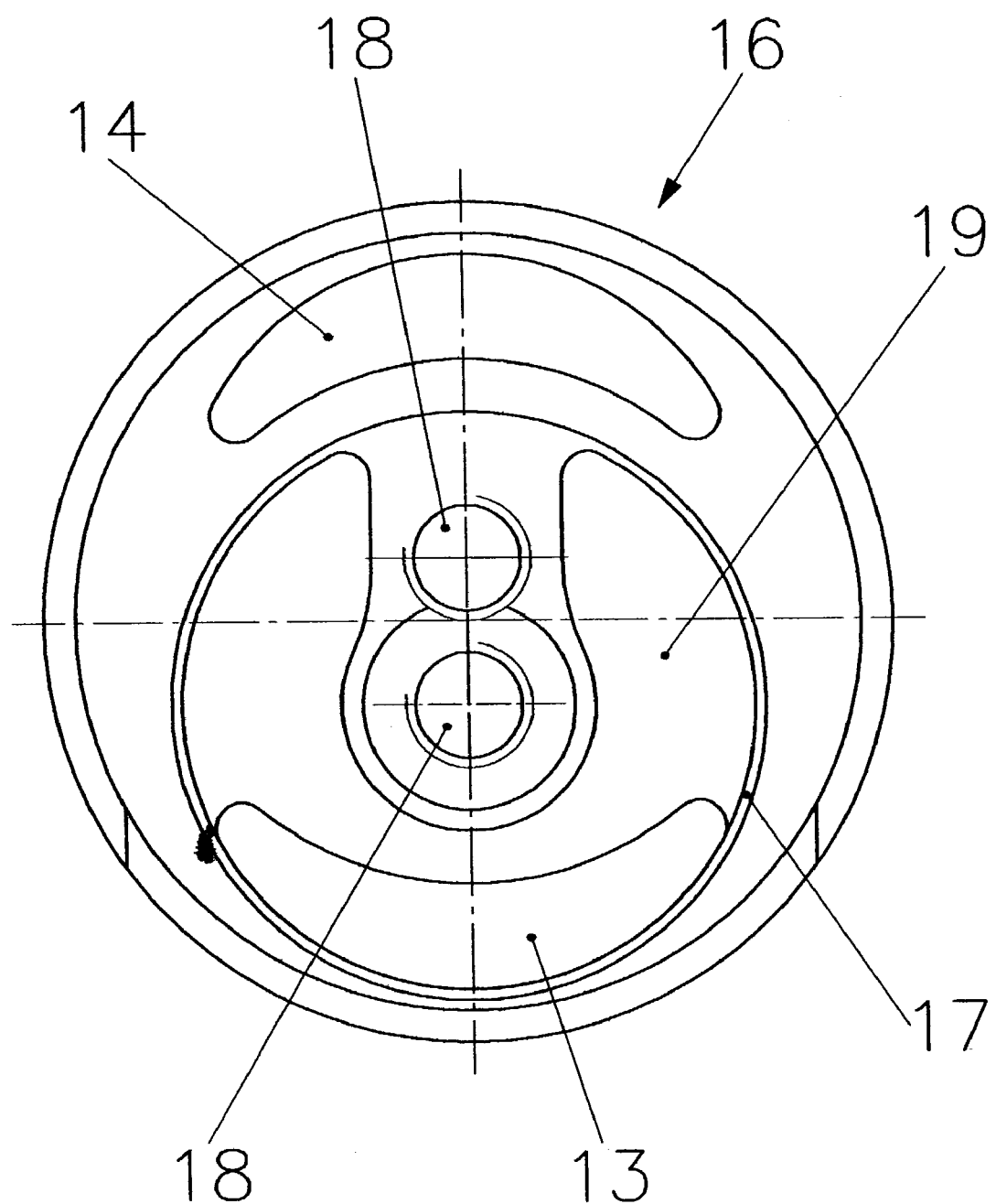
FIG. 4 is an overhead view of the piston illustrated in FIG. 3.

FIGS. 2 through 4 illustrate a shock-absorbing piston 10 in accordance with the present invention. Like the device illustrated in FIG. 1, piston 10 regulates the flow of fluid through the bypass. Its outer surface rests against the inner surface, flowerpot-shaped in this embodiment, of bypass 6 and is breached by two sickle-shaped ports 13 and 14. Stacks 11 and 12 of cupsprings alternately close ports 13 and 14 at the top and bottom. Stacks 11 and 12 of cupsprings are eccentrically disposed and, in the present example, fastened to the body 16 by way of screws 15.

As fluid flows in through the bypass's intake channel 8 and out through intake channel 7, with the shock-absorbing piston assembly entering the cylinder illustrated in FIG. 1, stack 11 will rise and permit the fluid to flow. Stack 12 on the other hand will act as a checkvalve, blocking the flow. When the fluid flows in the opposite direction, on the other hand, stack 12 will release and stack 11 will block the flow.

To facilitate clarity, the stacks of cupsprings have been left out of FIGS. 3 and 4. Stack 11, however, actually rests against a continuous edge 17. The threads 18 that secure screws 15 are all concentric to edge 17. Edge 17 surrounds a depression 19 that, in the embodiments illustrated in FIGS. 3 and 4, port 14 opens into. Port 13 on the other hand, due to the eccentricity of stacks 11 and 12 of cupsprings, is not blocked and accordingly permits a free flow.

The aforesaid shock-absorbing piston 10 can be employed not just for regulating the bypass. It can also act as a fluid-compressing piston, mounted on piston rod 2. In this event, the piston's accommodation must of course be flowerpot-shaped. Furthermore, a shock-absorbing piston 10 in accordance with the present invention can be employed as a base valve in a two-cylinder dashpot or as controls for a regulator outside the fixture.

LIST OF PARTS 1. cylinder
2. piston rod
3. fluid-compressing piston
4. port
5. stack of cupsprings
6. bypass
7. intake channel
8. intake channel
9. flow-regulating pin
10. shock-absorbing piston
11. stack of cupsprings
12. stack of cupsprings
13. port
14. port
15. screw
16. piston body
17. edge of depression
18. threads
19. depression

What is claimed is:

1. A shock-absorbing piston for hydraulic dashpots for motor vehicles, comprising: two hydraulics chambers separated by said piston, said piston having at least one port; said port having an end blocked by a resilient cap, said port being sickle shaped; said cap being mounted eccentrically on a face of said piston by an eccentric mounting comprised of said cap having a center and said piston having a center, said center of said cap being displaced in a radial direction from the center of said piston to form said eccentric mounting, whereby a maximum region is available for maximizing flow-through of the sickle shaped port providing a minimum resistance effect to hydraulic oil flow.

2. A shock absorbing piston as defined in claim 1, wherein said cap is round.

3. A shock-absorbing piston as defined in claim 1, wherein said cap has a circumference resting against a continuous edge around a depression, said sickle-shaped port opening into said depression.

4. A shock absorbing piston as defined in claim 1, wherein said piston has a circumference secured in a cylinder.

5. A shock-absorbing piston for hydraulic dashpots for motor vehicles, comprising: two hydraulics chambers separated by said piston, said piston having at least one port; said port having an end blocked by a resilient cap, said port being sickle shaped; said cap being mounted eccentrically on a face of said piston; said cap having a center displaced in a radial direction from a center of said piston so that said sickle shaped port opening has maximum large free flow cross-section; said port having a cross-section for minimum hydraulic flow resistance.

6. A shock-absorbing piston as defined in claim 5, wherein said cap is round.

7. A shock-absorbing piston as defined in claim 5, wherein said cap has a circumference resting against a continuous edge around a depression, said sickle-shaped port opening into said depression.

8. A shock-absorbing piston as defined in claim 5, wherein said piston has a circumference secured in a cylinder.

9. A shock-absorbing piston for hydraulic dash-pots for motor vehicles, comprising: two hydraulic chambers, each of said chambers being closeable by said piston with respect to the other chamber; said piston having at least one port; a spring circular cap for closing a side of said port, said cap lying eccentrically on a face of said piston, said at least one port comprising, two sickle-shaped ports and said cap being eccentrically mounted by an eccentric mounting so that one port is adjacent the other port, said eccentric mounting being comprised of said cap having a center and said piston having a center, said center of said cap being displaced in radial direction from the center of said piston to form said eccentric mounting, whereby a maximum region is available for including the sickle shaped ports providing a minimum resistance effect to hydraulic oil flow.

10. A shock-absorbing piston as defined in claim 9, wherein said cap has an outer rim lying on a continuous edge enclosing a depression communicating with the sickle shaped ports.

11. A shock-absorbing piston as defined in claim 9 wherein said piston is supported at a circumference of said piston.

12. A shock-absorbing piston as defined in claim 9, wherein said cap comprises two separate caps attached to separate attachment points on said piston, said attachment points being spaced from each other in radial direction.

* * * * *